US010035577B2

(12) United States Patent
Furfari et al.

(10) Patent No.: US 10,035,577 B2
(45) Date of Patent: Jul. 31, 2018

(54) REINFORCED VEHICLE STRUCTURAL PART AND VEHICLE (71) Applicants: Airbus Operations GmbH, Hamburg (DE); EADS Deutschland GmbH, Ottobrunn (DE)

(72) Inventors: Domenico Furfari, Hamburg (DE); Elke Hombergsmeier, Forstern (DE)

(73) Assignees: Airbus Operations GmbH (DE); EADS Deutschland GmbH (DE)

( * ) Notice: Subject to any disclaimer, the term of this patent is extended or adjusted under 35 U.S.C. 154(b) by 493 days.

(21) Appl. No.: 14/078,595

(22) Filed: Nov. 13, 2013

(65) Prior Publication Data

US 2014/0134043 A1 May 15, 2014

Related U.S. Application Data (60) Provisional application No. 61/726,623, filed on Nov. 15, 2012.

(30) Foreign Application Priority Data

Nov. 15, 2012 (DE) .......................... 10 2012 111 022

(51) Int. Cl.
C21D 7/06 (2006.01)
B64C 1/06 (2006.01)
C21D 10/00 (2006.01)
B64F 5/40 (2017.01)
B64C 1/00 (2006.01)

(52) U.S. Cl.
CPC .................. *B64C 1/06* (2013.01); *B64F 5/40* (2017.01); *C21D 7/06* (2013.01); *C21D 10/005* (2013.01); *B64C 2001/0081* (2013.01); *Y10T 29/49622* (2015.01)

(58) Field of Classification Search
CPC ................................ C21D 7/06; C21D 10/005
See application file for complete search history.

(56) References Cited

U.S. PATENT DOCUMENTS

| | | |
|---|---|---|
| 1,922,063 A | 8/1933 | Vaughn |
| 1,932,430 A | 10/1933 | Weyerbacher |
| 2,378,043 A | 6/1945 | Sorensen et al. |
| 3,850,698 A | 11/1974 | Mallozzi et al. |
| 4,401,477 A | 8/1983 | Clauer et al. |
| 4,937,421 A | 6/1990 | Ortiz, Jr. et al. |
| 5,297,760 A | 3/1994 | Hart-Smith |
| 5,569,018 A | 10/1996 | Mannava et al. |
| 5,571,575 A | 11/1996 | Takayanagi |
| 5,842,317 A | 12/1998 | Pettit |
| 6,159,619 A | 12/2000 | Rockstroh et al. |
| 6,203,633 B1 | 3/2001 | Clauer et al. |
| 6,288,358 B1 | 9/2001 | Dulaney et al. |
| 6,328,261 B1 | 12/2001 | Wollaston et al. |
| 6,349,988 B1 * | 2/2002 | Foster et al. ............... 296/181.6 |
| 7,219,044 B1 | 5/2007 | Prevey et al. |
| 7,857,258 B2 | 12/2010 | Normand et al. |
| 8,322,004 B2 | 12/2012 | Lewis et al. |
| 2002/0050157 A1 | 5/2002 | Kennerknecht et al. |
| 2002/0148270 A1 | 10/2002 | Easterbrook |
| 2002/0174528 A1 | 11/2002 | Prevey |
| 2003/0042234 A1 | 3/2003 | Suh et al. |
| 2004/0052581 A1 | 3/2004 | Assler et al. |
| 2005/0092724 A1 | 5/2005 | Warren et al. |
| 2005/0155203 A1 | 7/2005 | Prevey |
| 2005/0182478 A1 | 8/2005 | Holman et al. |
| 2007/0033980 A1 | 2/2007 | Nishimura |
| 2011/0248070 A1 | 10/2011 | Furfari et al. |
| 2011/0290770 A1 | 12/2011 | Steinwandel et al. |
| 2014/0134043 A1 | 5/2014 | Furfari et al. |

FOREIGN PATENT DOCUMENTS

| | | |
|---|---|---|
| DE | 694 31 314 T2 | 1/2003 |
| DE | 10 2008 044 407 A1 | 6/2010 |
| DE | 102010003742 A1 | 10/2011 |
| DE | 11 2010 001 810 T5 | 6/2012 |
| DE | 10 2012 111022 A1 | 6/2014 |
| EP | 0 094 912 B1 | 12/1986 |
| EP | 0 323 660 A1 | 7/1989 |
| EP | 1 752 547 A1 | 2/2007 |

(Continued)

OTHER PUBLICATIONS

Yang et al. "Experimental study on Residual stress distribution of laser rapid forming process", Rare Metal Material Engineering, 33 (12), 2004.*
European Search Report (EP 14157274.3)(dated Sep. 2014).
Engineering Fracture Mechanics, vol. 76, Issue 1, Jan. 2009, pp. 114-133.
International Journal of Fatigue, vol. 31, Issue 6, Jun. 2009, pp. 998-1011.
Rubio-Gonzalez C et al: "Effect of laser shock processing on fatigue crack growth and fracture toughness of 6061-T6 aluminum alloy", Materials Science and Engineering A: Structural Materials: Properties, Microstructure & Processing, Lausanne; CH, Bd. 386, Nr. 1-2, Nov. 25, 2004, p. 291-295, XP004604669, ISSN: 0921-5093.
Shepard M J et al: "Introduction of Compressive Residual Stresses in TI—6AL-4V Simulated Airfoils via Laser Shock Processing", Journal of Materials Engineering and Performance, ASM International, Materials Park, OH, US, Bd. 10, Nr. 6, Dec. 1, 2001, p. 670-678, XP001089758, ISSN:1059-9495.

(Continued)

*Primary Examiner* — Edward Johnson
(74) *Attorney, Agent, or Firm* — Lerner, David, Littenberg, Krumholz & Mentlik, LLP (57) ABSTRACT A vehicle structure component reinforced by means of an area, a vehicle including such a vehicle structure component, and a corresponding method to reinforce a vehicle structure component are proposed. The area includes a compressive residual stress in a first direction and a compressive or tensile residual stress in a second direction being vertically aligned to the first direction, wherein the ratio of the compressive stress in the first direction and the compressive or tensile residual stress lies between −0.2 and +1.0. Hence, the propagation direction of cracks in such areas is diverted, faster pressure equalization takes place, and further crack propagation is inhibited.

16 Claims, 5 Drawing Sheets

(56) References Cited

FOREIGN PATENT DOCUMENTS

| | | |
|---|---|---|
| EP | 1 978 114 A1 | 10/2008 |
| EP | 2 364 374 B1 | 6/2013 |
| FR | 2 915 458 A1 | 10/2008 |
| GB | 2 257 163 A | 1/1993 |
| JP | 2006 281664 A | 10/2006 |
| WO | 96/27684 A1 | 9/1996 |
| WO | 2010/063643 A1 | 6/2010 |

OTHER PUBLICATIONS

Rodopoulos C A et al: "Effect of Controlled Shot Peening and Laser Shock Peening on the Fatigue Performance of 2024-T351 Aluminum Alloy" Journal of Materials Engineering and Performance, ASM International, Materials Park, OH, US, Bd. 12, Nr. 4, Aug. 1, 2003, p. 414-419, XP001169992, ISSN: 1059-9495.

Liu, Q. et al: "The effect of laser power density on the fatigue life of laser-shock-peened 7050 aluminum alloy", Fatigue & Fracture of Engineering Materials & Structures, 30(11), 1110-1124, CODEN: FFESY; ISSN: 8756-758X, 2007, XP002576049.

Alberto Ruiz: "Surface acoustic wave velocity measurements on surface-treated metals by laser-ultrasonic spectroscopy", Feb. 17, 2004, University of Cincinnati, XP002576050, p. 90-93,118-125, Figs. 4.1-4.2,5.1-5.3.

European Search Report (14183952.2) dated Feb. 17, 2015.

Jian et al., "Experimental Research on Residual Stress Distribution in Laser Rapid Forming Process", Rare Metal Material Engineering, vol. 33, Issue 12, Dec. 2004 (see Section 1.1 "Preparation of a forming test piece", on p. 1304, Figure 2 and Section 2.2 "Residual stress distribution characterisctis" on p. 1305, and Figures 3-4 and Section 2.3 "Discussion" on p. 1306.

Chinese Office Action for Application No. 201310573593.6 dated Feb. 3, 2015.

Xiang Zhang, Phil Irving, Marco Boscolo, Douglas Figueroa-Gordon, Giuliano Allegri; Fail Safety of Integral Metallic Structures Reinforced by Bonded Crack Retarders; Cranfield University, UK, 2006 (in Patorg).

M.-V. Uz, M. Koçak, F. Lemaitre, J.-C. Ehrström, S. Kempa, F. Bron, Improvement of Damage Tolerance of Laser Beam Welded Stiffened Panels for Airframes via Local Engineering, Int. Journal of Fatigue, 2008 (in Patorg).

M. Pacchione, E. Hombergsmeier, Hybrid Metal Laminates for Low Weight Fuselage Structures, in S.G. Pantelakis, C. A. Rodopoulos (Eds.), Engineering Against Fracture, Proceedings of the 1st Conference, Springer 2009 (in Patorg).

Gary L. Farley, John A. Newman, Mark A. James, Selective Reinforcement to Improve Fracture Toughness and Fatigue Crack Growth Resistance in Metallic Structures, 45th AIAA/ASME/ASCE/AHS/ASC Structures, Structural Dynamics & Materials Conference, 19-22 (in Patorg) Apr. 2004, Palm Springs, California.

Jon E. Rankin, Michael R. Hill, Lloyd A. Hackel, The effects of process variations on residual stress in laser peened 7049 T73 aluminum alloy, Materials Science and Engineering A349 (2003) pp. 279-291, Elsevier 2002.

E. Hombergsmeier, D. Furfari, N. Ohrloff, U.C. Heckenberger, V. Holzinger, Enhanced Fatigue and Damage Tolerance of Aircraft Components by Introduction of Residual Stresses—A Comparison of Different Processes, 27th ICAF Symposium, Jerusalem, Jun. 5-7, 2013 (in Patorg).

S. Zou, Z. Cao, Y. Zhao, and M. Qian, "Laser peening of aluminum alloy 7050 with fastener holes," Chin. Opt. Lett. 6, 116-119 (2008). Accessible from https://www.osapublishing.org/col/abstract.cfm?uri=col-6-2-116; accessed on Mar. 28, 2017.

ResearchGate, "Can compressive residual stresses be higher than material Yield strength?", with response by Jeremy S. Robinson on Jul. 15, 2014; https://www.researchgate.net/post/Can_compressive_residual_stresses_be_higher_than_material_ Yield_strength, accessed Mar. 30, 2017.

\* cited by examiner

REINFORCED VEHICLE STRUCTURAL PART AND VEHICLE

CROSS-REFERENCE TO RELATED APPLICATIONS

This application claims the benefit of U.S. Provisional Patent Application No. 61/726,623, filed Nov. 15, 2012, the disclosure of which is hereby incorporated herein by reference.

TECHNICAL FIELD

The invention relates to a vehicle structural part and to a vehicle comprising an area in which there is a compressive residual stress in a first direction and a compressive or tensile residual stress in a second direction perpendicular to the first direction. The invention further relates a method for reinforcing a vehicle structural part.

BACKGROUND OF THE INVENTION

In vehicle structural parts, for example of aircraft, cracks may form, and this may lead to major damage to the point where the vehicle structure fails. Cracks in aircraft structures are generally due to a material weakening as a result of particular static or dynamic mechanical loads.

For example, a crack may also form and progress as a result of accidental damage to an aircraft structure in the form of scoring during improper maintenance. Accidentally produced damage of this type may be the starting point for subsequent crack formation or subsequent crack progression. It is therefore expedient to eliminate this damage resulting from repair measures, so as to avoid crack formation. However, cracks may also have other causes.

During maintenance, the damaged spots may be repaired by cutting out the entire area in which cracks have formed and replacing it with new material, which is inserted there or arranged above. In the case of scratches where it is expected that cracks will form starting from the scratches, the repair process may be carried out in the same manner as for crack repair. Replacing wing unit structures is time-consuming and leads to increased repair and operating costs. Material areas which are at risk of crack formation can be treated prior to use by laser shocking (laser shock hardening, laser shock treatment or laser shock peening). Laser shock peening, in the following also called laser shocking, is a method for producing an area of deep compressive residual stresses by processing the surface of a workpiece by laser shocking. Laser shocking conventionally uses beam pulses from pulsed lasers so as to transmit impact or shock waves onto the surface of a workpiece. By means of a plasma, the pulsed laser beam incident on the component surface from the laser beam source produces a strong local compressive force on a portion of the surface. In this context, at the point of incidence of the laser beam, below a closed liquid film, sudden removal or evaporation of a thin layer of this surface or of a coating (such as a metal adhesive strip or a coat of paint) leads to a plasma, resulting in an explosive force being produced. The compressive pulse from the rapidly expanding plasma emits a shockwave which migrates into the item. This compressive shockwave brought about by the laser pulse leads to deep local compressive deformations in the component. These local plastic deformations produce compressive residual stresses in the material. Laser shocking is disclosed in U.S. Pat. No. 3,850,698, titled "Altering Material Properties", and in U.S. Pat. No. 4,401,477, titled "Laser Shock Processing". During laser shocking, a strong local compressive force is transmitted onto part of the workpiece surface. Laser shocking is used so as to bring compressive residual stresses onto a workpiece, significantly increasing the resistance of the workpiece to a fatigue fracture. This application is disclosed for example in U.S. Pat. No. 4,937,421, titled "Laser Peening System and Method".

DE 10 2008 044 407 A1 and US 2011/0290770 A1 disclose a method for irradiating an aircraft component having a damaged spot, which is carried out during maintenance on the aircraft. In this context, an area of the aircraft structural part close to the damaged spot is treated using a pulsed laser beam. Meanwhile, a compression wave passes through the irradiated area of the aircraft structural part and produces a compressive bias in this area. Thus, the propagation of new or existing cracks can be slowed in areas which are deemed critical.

BRIEF SUMMARY OF THE INVENTION

A vehicle structural part is proposed in which in a first area there is a compressive residual stress in a first direction and a compressive or tensile residual stress in a second direction perpendicular to the first direction. The ratio of the compressive residual stress in the first direction and the compressive or tensile residual stress in the second direction lies between −0.2 and +1.0.

In this context, tensile residual stresses are defined as positive values and compressive residual stresses are defined as negative values having the unit Pa. These compressive and tensile residual stresses are also referred to generally as residual stresses. Further, the area may also comprise compressive and/or tensile residual stresses in the direction perpendicular to the first and second directions.

In accordance with an embodiment of the invention, the first area extends from a surface of the vehicle structural part into the vehicle structural part. For example, the compressive residual tension lies in a first direction extending tangential to the surface of the vehicle structural part, and the compressive or tensile residual tension lies in a direction tangential to the surface of the vehicle structural part and perpendicular to the first direction.

Thus, a compressive residual stress can accordingly be compensated by applying a tensile force in the direction the compressive residual stress. Equivalently, a tensile residual stress can be compensated by applying a compressive force.

For example, there is a compressive residual stress in the first direction and a tensile residual stress in the second direction. The area may be arranged in such a way that the expected crack propagation direction of a future crack which propagates in the vehicle structural part will correspond substantially to the second direction in the initial stage.

When the crack reaches the first area, the compressive residual stress in the first direction in the first area prevents the crack from propagating in the second direction. At the same time, the tensile residual stress extending in the second direction in the first area provides crack propagation in the first direction.

Thus, the crack propagation direction can be diverted from the initial second direction to the first direction, at the latest when the crack reaches the area comprising the residual stresses. Thus, selective configuration of the ratio of the residual stresses in the first and second directions leads to controlled diversion of the crack propagation direction.

The areas comprising compressive and/or tensile residual stresses lead to the propagation direction of the crack being diverted, resulting in U-shaped or L-shaped cracks for example. U-shaped or L-shaped cracks can cause the U-shaped or L-shaped area, bordered by the crack, of the aircraft structural part to swing open, and thus lead to significantly faster pressure equalisation than with straight cracks. Thus, long cracks can be prevented from forming, and the structural part can be protected from complete failure and made more tolerant to damage.

In accordance with an embodiment of the invention, the compressive residual stress in the first direction and the compressive or tensile residual stress in the second direction can be produced by laser shock peening (laser shocking). In this context, a surface provided with a thin layer (for example with a metal adhesive strip or a coat of paint) is treated with a pulsed laser beam. At the point of incidence of the laser beam, sudden removal or evaporation of this thin layer leads to a plasma, resulting in an explosive force being produced. The compressive pulse from the rapidly expanding plasma emits a shockwave, which migrates into the vehicle structural part and leads to deep local compressive deformations and thus to residual stresses in the vehicle structural part.

The ratio of the residual stresses in the different directions can be controlled using process parameters, for example the wavelength of the radiation emitted by the laser, the power density of the radiation, the repetition rate of the laser, the beam diameter, or the geometry of the laser pulse. Further, an area may be processed by laser shocking in a plurality of layers. In this context, the ratio of the residual stresses can be controlled for example by way of the number of irradiated layers and the degree of overlap thereof.

Basically, two different arrangements are used for the laser shock hardening or laser shocking.

In direct ablation, the incident laser radiation is absorbed on the exposed material surface. The material vapour (plasma) which forms in this context can propagate into the surrounding atmosphere unimpeded.

By contrast, confined ablation works with a cover layer which is transparent to the laser radiation and which is applied to the material surface. The incident radiation penetrates the cover layer unimpeded and is incident on the surface, where it is absorbed and produces the plasma. However, the propagation of the plasma is now impeded by the cover layer. The aim of this arrangement is to lengthen the pressure on the surface and the time over which the pressure acts.

In a modification to confined ablation, the surface of the workpiece is further additionally provided with an absorption layer, which is located between the surface and the cover layer and is ablated instead of them.

In accordance with an embodiment of the invention, the area can extend from a superficial region of the vehicle structural part into the vehicle structural part over 30% to 100% of the material thickness thereof. This may for example be controlled by way of the wavelength of the radiation emitted by the laser, the power density of the radiation, the repetition rate of the laser, or the beam diameter. Further, an area may also be treated by laser shocking in a plurality of layers. In this context, the depth of the residual stresses may be controlled by way of the number of layers and the degree of overlap thereof.

In an embodiment of the invention, the area is configured in the shape of a strip, the strip-shaped area being arranged on a surface of the vehicle structural part and reaching into the vehicle structural part. This strip may divert, slow down, or even stop the propagation of cracks which occur in an extended surface area of the vehicle structural part.

In accordance with a further embodiment of the invention, the area is configured in the shape of a straight strip. In aircraft structural parts for example, this straight strip may be arranged in the longitudinal or peripheral direction with respect to the aircraft fuselage. Thus, the propagation direction of cracks which propagate in the longitudinal or peripheral direction with respect to the aircraft fuselage can be diverted. A further option is for the strips to be arranged diagonally with respect to the fuselage direction, or for one or more strips to wind around the aircraft fuselage in a spiral shape.

In accordance with an embodiment of the invention, the strip has at least one curve. Thus, for example, the strip can be guided around other structures, for example around drain outlets.

In accordance with an embodiment of the invention, the strip has a width of 50 mm-10 mm or of 40 mm-20 mm.

In accordance with an embodiment of the invention, the vehicle structural part may be configured to absorb a tensile load which is caused by the driving operation. In this context, the first direction is not arranged perpendicular to the tensile load. Thus, the first area comprises a component of the compressive residual tension, which counters the tensile load, in the direction of the tensile load. This leads to cracks which result from the tensile load being stopped and diverted.

In accordance with an embodiment of the invention, the vehicle structural part comprises a second area, in which there is a compressive residual stress in a third direction and a compressive or tensile residual stress in a fourth direction perpendicular thereto. The ratio of the compressive residual stress in the third direction and the compressive or tensile residual stress in the fourth direction lies between −0.2 and +1.0. By providing a plurality of areas of this type, the propagation of long cracks may be prevented over a large area.

In accordance with an embodiment of the invention, the first area and the second area are of the same shape and are arranged mutually parallel. For example, on a structural part of an aircraft fuselage, for example a skin plate, a plurality of areas arranged in the peripheral direction may be provided along the aircraft fuselage. In this way, the propagation of straight cracks in the longitudinal direction with respect to the aircraft fuselage can be prevented.

In accordance with an embodiment of the invention, the first area and the second area are arranged parallel and are at a distance of 50 cm-10 cm or of 40 cm-20 cm from one another. The distance between the first and second areas also depends on the size of the structural part and on the size of the component which contains the structural part. The distance between the first and second area further depends on the place of use of the component.

In accordance with a further embodiment of the invention, the first area and the second area are not arranged mutually parallel. Thus for example in an aircraft structural part of an aircraft fuselage, areas can be arranged in the longitudinal and in the peripheral direction, and the propagation of cracks in the longitudinal and in the peripheral direction can thus be prevented.

In accordance with a further embodiment of the invention, the ratio of the compressive residual stress in the first direction and the compressive or tensile residual stress in the second direction lies between −0.2 and +0.8.

In accordance with a further embodiment of the invention, the ratio of the compressive residual stress in the first direction and the compressive or tensile residual stress in the second direction lies between −0.2 and +0.6.

In accordance with a further embodiment of the invention, the ratio of the compressive residual stress in the first direction and the compressive or tensile residual stress in the second direction lies between −0.2 and +0.4.

In other words, the residual stresses in the vehicle structural part may not be isotropic. In this way the propagation of cracks may be more effectively diverted, slowed down or stopped.

In a further embodiment of the invention, a vehicle is provided comprising a vehicle structural part which contains one or more areas of this type. For example, a vehicle of this type may be an aircraft. However, the vehicle may also be an airship, helicopter, satellite component, train, ship or motor vehicle.

The invention further relates to a method for reinforcing a structural part of a large-format component (for example a vehicle or the mast, transmission or blade connection of a wind turbine), which comprises the steps of producing a compressive residual tension in a first direction and producing a compressive or tensile residual tension in a second direction perpendicular to the first direction, the ratio of the compressive residual stress in the first direction and the compressive or tensile residual stress in the second direction lying between −0.2 and +1.0. The method can also be carried out in one operation.

Finally, the invention relates to a method of this type in which the compressive residual tension in the first direction and the compressive or tensile residual tension in the second direction are produced by laser shocking.

Further features, advantages and possible applications of the invention emerge from the following description of the embodiments and from the drawings. In this context, all of the features which are disclosed and/or shown in the drawings form the subject-matter of the invention both per se and in any desired combination, irrespective of how they are compiled in the individual claims or dependencies. Where like reference numerals are used in different drawings in the following description, they denote like or similar elements. However, like or similar elements may also be denoted by different reference numerals.

DETAILED DESCRIPTION

Figure 1:
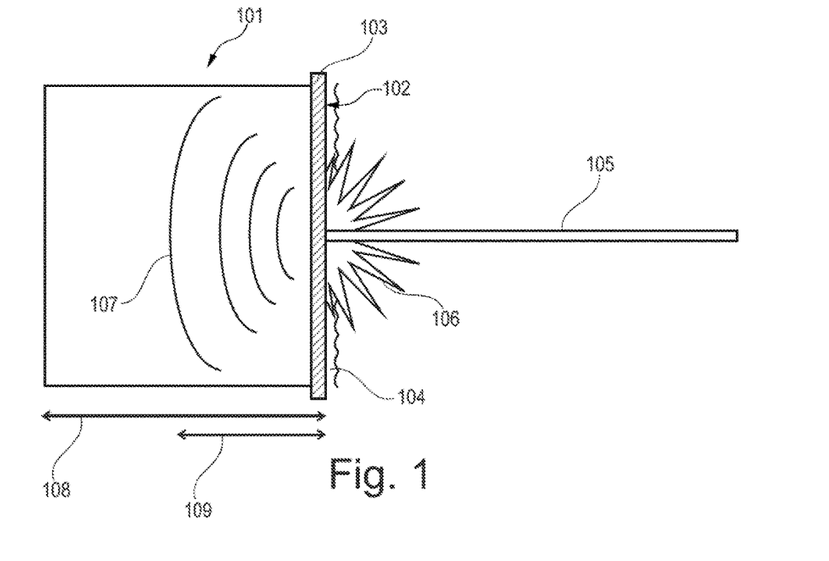
FIG. 1 shows a cross-section of an area irradiated with laser shock radiation.

FIG. 1 shows a cross-section of an area 101 of a vehicle structural part.

At this point, it should be noted that the vehicle structural part may also be a structural part of another device, for example a shell segment of the mast, the transmission or the blade connection of a wind turbine.

The irradiated superficial region 102 may comprise a coating 103 (for example a metal adhesive strip or a coat of paint). In turn, there may be a liquid film 104 such as a water film above the superficial region 102 of the vehicle structural part. So as to produce residual tensions in the area 101, the superficial region 102 is irradiated with a pulsed laser beam 105 through the liquid film 104. At the point of incidence of the laser beam 105, sudden removal or evaporation of the coating leads to a plasma 106, resulting in an explosive force being produced. The resulting compressive pulse is reflected from the liquid film 104 and brings about a compressive shockwave 107 which propagates into the vehicle structural part 501. These local plastic deformations produce residual tensions in the material, which have a depth 109 of 30% to 100% of the material thickness 108 in the area 101 of the vehicle structural part 501.

Figure 2:
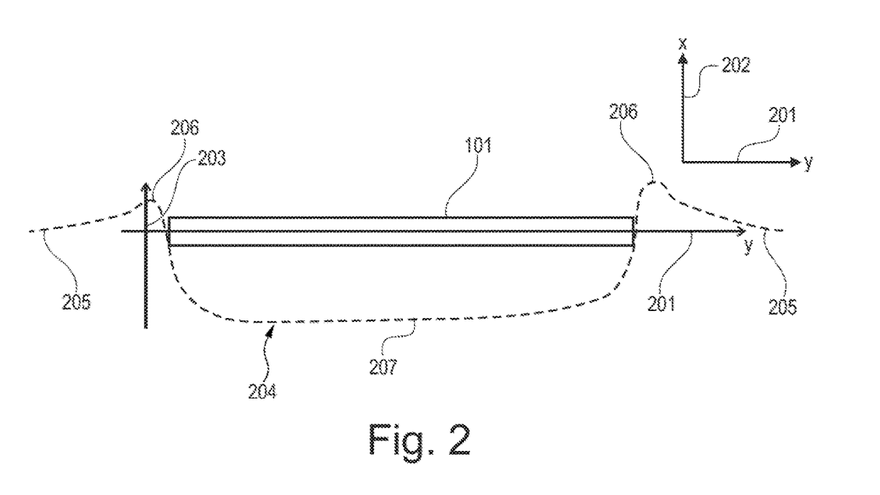
FIG. 2 shows a strip-shaped area comprising residual tensions in accordance with an embodiment of the invention in a plan view and a distribution of the compressive residual tension along the strip-shaped area.

FIG. 2 is a plan view of a straight strip-shaped area 101 comprising residual tensions. In this context, y denotes the position in a first direction 201, extending tangential to the surface in the longitudinal direction of the strip-shaped area 101, the position y=0 denoting the position in the centre of the strip-shaped area 101. Similarly, x denotes the position in a second direction 202, extending tangential to the surface and perpendicular to the first direction 201, x=0 denoting the position in the centre of the strip-shaped area 101. Further, the residual tension 203 in the first direction 201 is depicted as a function of the position y in the first direction 201. In this context, the position x perpendicular to the strip-shaped area 101 is constant at x=0. Within the strip-shaped area 101, there is a predominating compressive residual tension 207. Directly outside the strip-shaped area, the vehicle structural part comprises a tensile residual tension 206, and further away from the area 101, the tensile residual tension returns asymptotically towards 0 (cf. reference numeral 205).

Figure 3:
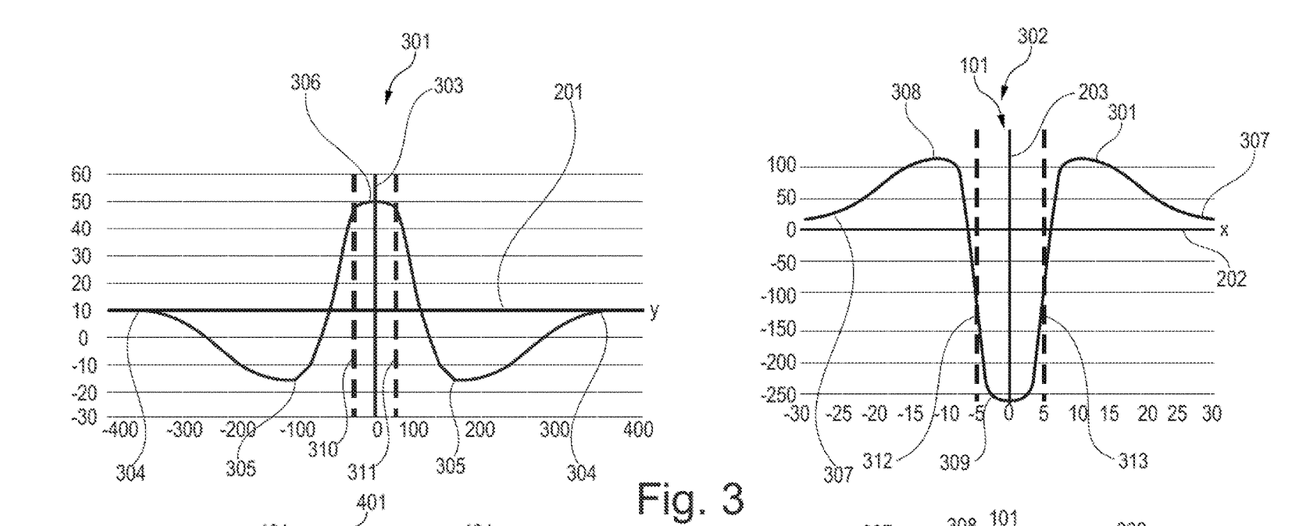
FIG. 3 shows an anisotropic distribution of residual tensions in a strip-shaped area in accordance with an embodiment of the invention.

FIG. 3 shows the distributions of the residual tensions in a strip-shaped area 101, which has a length of 100 mm and a width of 10 mm, the residual tensions being configured anisotropically.

In graph 301, the residual tension 303 in the direction 202 perpendicular to the strip-shaped area 101 is depicted as a function of the position y in the direction 201 of the strip-shaped area 101, the position x being constant at x=0 and the dashed lines 310 and 311 representing the edges of the strip-shaped area. Within the strip-shaped area 101, the vehicle structural part 501 comprises a tensile residual tension 306. Directly outside the strip-shaped area 101, the vehicle structural part 501 comprises a compressive residual tension 305, which returns 304 asymptotically towards 0 with increasing distance. In graph 302, the residual tension 203 in the direction 201 of the strip-shaped area 101 is depicted as a function of the position x in the direction 202 perpendicular to the direction 201 of the strip-shaped area 101, the position y being constant at y=0 and the dashed lines 312 and 313 representing the edges of the strip-shaped area 101. Within the strip-shaped area 101, the vehicle structural part 501 comprises a compressive residual tension 309. Directly outside the strip-shaped area, the vehicle structural part comprises a tensile residual tension 308, which returns 307 asymptotically towards 0 with increasing distance from the strip-shaped area 101

Figure 4:
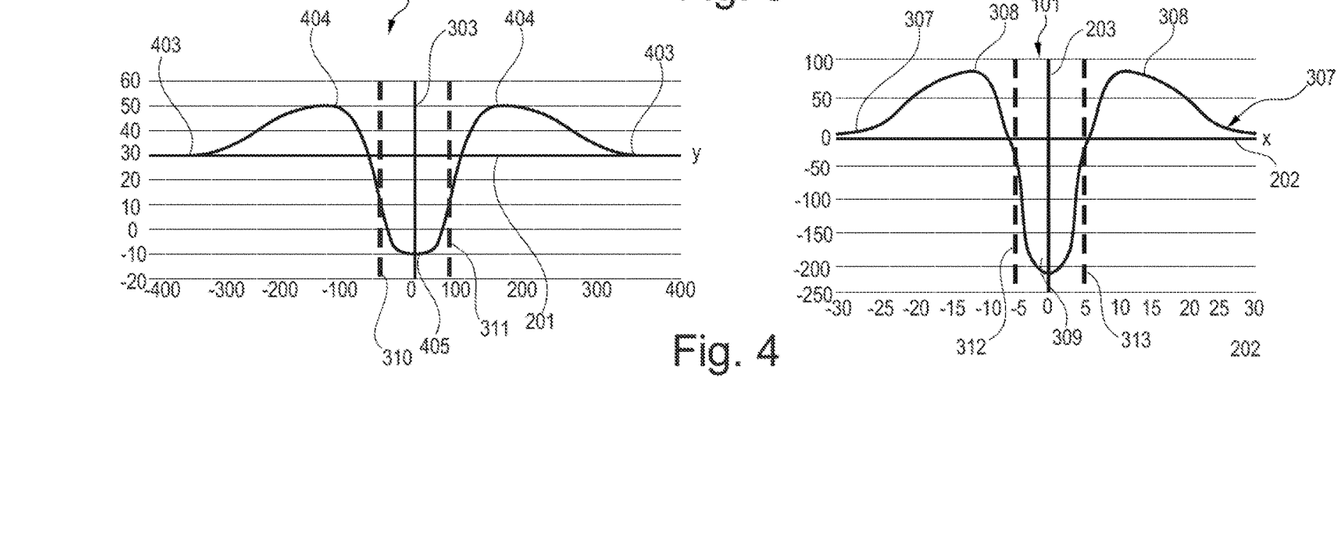
FIG. 4 shows an isotropic distribution of residual tensions in a strip-shaped area in accordance with an embodiment of the invention.

FIG. 4 shows the distributions of the residual tensions in a strip-shaped area 101, which has a length of 100 mm and a width of 10 mm, the residual tensions being configured isotropically.

In graph 401, the residual tension 303 in the direction 202 perpendicular to the strip-shaped area 101 is depicted as a function of the position y in the direction 201 of the strip-shaped area 101, the position x being constant at x=0 and the dashed lines 310 and 311 representing the edges of the strip-shaped area 101. Within the strip-shaped area 101, the vehicle structural part 501 comprises a compressive residual tension 405. Directly outside the strip-shaped area 101, the vehicle structural part 501 comprises a tensile residual tension 404, which returns asymptotically 403 towards 0 with increasing distance. In graph 402, the residual tension 203 in the direction 201 of the strip-shaped area 101 is depicted as a function of the position x in the direction 202 perpendicular to the direction 201 of the strip-shaped area 101, the position y being constant at y=0 and the dashed lines 312 and 313 representing the edges of the strip-shaped area 101. Within the strip-shaped area 101, the vehicle structural part 501 comprises a compressive residual tension 309. Directly outside the strip-shaped area, the vehicle structural part comprises a tensile residual tension 308, which returns 307 asymptotically towards 0 with increasing distance from the strip-shaped area 101

Figure 5:
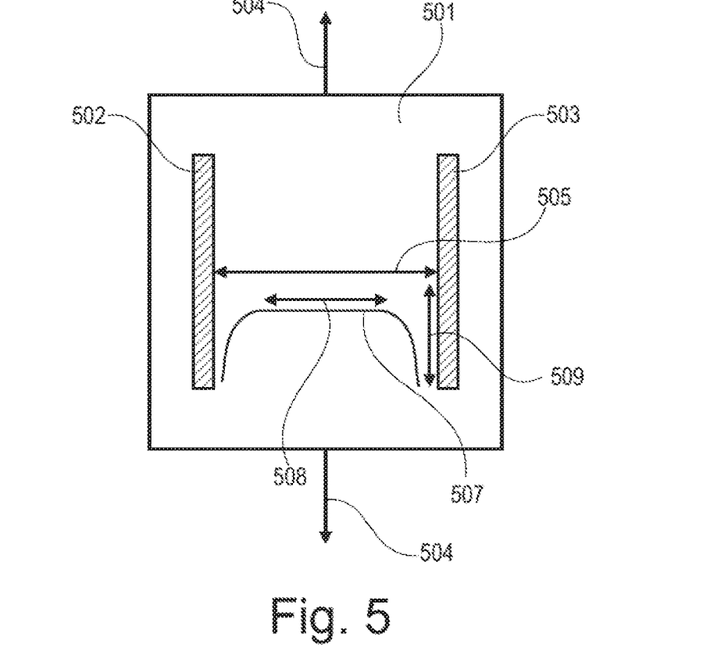
FIG. 5 is a schematic plan view of a structural part according to an embodiment of the invention which comprises two strip-shaped areas arranged mutually parallel.

FIG. 5 is a schematic plan view of a vehicle structural part 501 in accordance with an embodiment of the invention. This vehicle structural part 501 comprises two straight, parallel strip-shaped areas 502 and 503, which are at a distance 505 from one another. The vehicle structural part may be configured to absorb a tensile load 504. For example, the strip-shaped areas 502 and 503 are arranged in the direction 509 of the tensile load 504. A crack propagation direction 508 is substantially perpendicular to the direction 509 of the tensile load 504. At a greater distance from an area 502 or 503 comprising residual tensions, a crack 507 propagates substantially in the crack propagation direction 508. The closer the crack 507 comes to one of the areas 502 or 503, the more the propagation direction thereof changes in the direction 509 of the strip-shaped areas and the tensile load. Thus, the crack may be of a U-shape, which leads to more rapid pressure equalisation.

Figure 6:
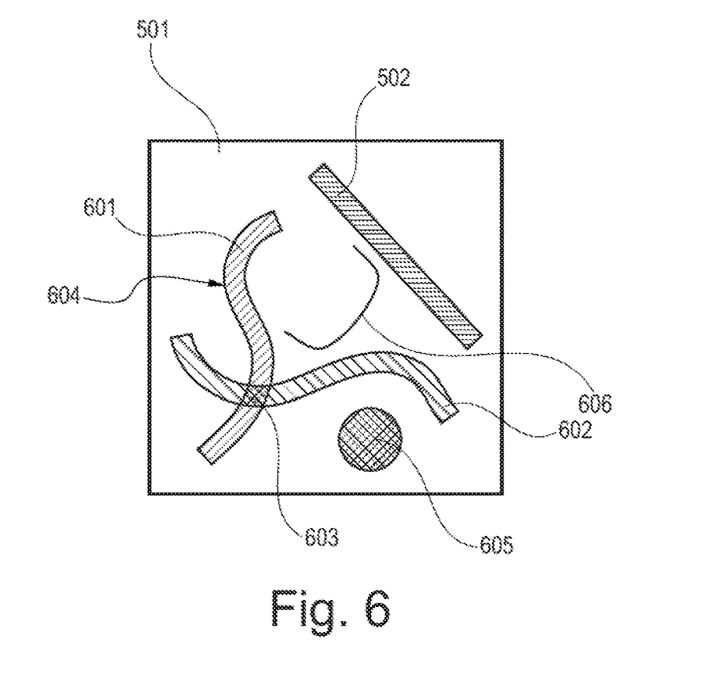
FIG. 6 is a schematic plan view of a structural part according to an embodiment of the invention which comprises one straight and two curved two strip-shaped areas not arranged mutually parallel.

FIG. 6 is a schematic plan view of a vehicle structural part 501 in accordance with an embodiment of the invention. This vehicle structural part 501 comprises a straight strip-shaped area 502. The vehicle structural part 501 further comprises two further strip-shaped areas 601 and 602, which comprise at least one curve 604. One of the two further curved strip-shaped areas 602 may for example be arranged around a drain outlet 605. Further, these two further strip-shaped areas 601 and 602 may not be arranged mutually parallel 604, in such a way that they intersect and form an overlap point 603. A crack 606 can for example be deflected from the initial propagation direction thereof in such a way that it describes a U-shape. At the same time, a critical area, for example a drain outlet 605, can be protected from cracks.

Figure 7:
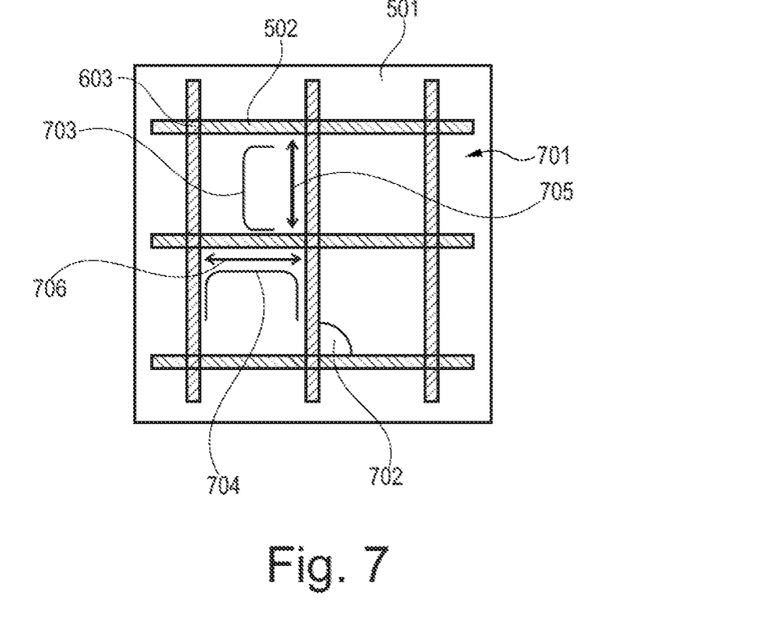
FIG. 7 is a schematic plan view of a structural part according to an embodiment of the invention which comprises straight strip-shaped areas arranged in a check pattern.

FIG. 7 is a schematic plan view of a vehicle structural part 501 in accordance with an embodiment of the invention. The vehicle structural part 501 comprises a plurality of straight strip-shaped areas 502. These straight strip-shaped areas 502 are arranged in a check pattern 701, in that they intersect at a right angle 702 and form overlap areas 603. Thus, the propagation direction both of cracks 703 propagating in the direction 705 and of cracks 704 propagating in the direction 706 can be diverted, and the formation of longer cracks can thus be prevented in both directions.

Figure 8:
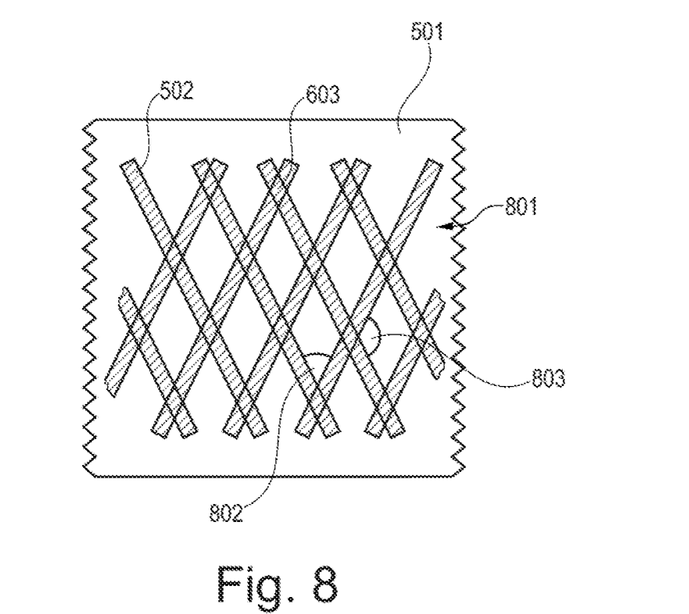
FIG. 8 is a schematic plan view of a structural part according to an embodiment of the invention which comprises straight strip-shaped areas arranged in a rhombus pattern.

FIG. 8 is a schematic plan view of a vehicle structural part 501 in accordance with an embodiment of the invention. The vehicle structural part 501 comprises a plurality of straight strip-like areas 502, which are arranged in a rhombus-shaped pattern 801. Thus, the strip-shaped areas intersect at an acute angle 802 and at an obtuse angle 803 and for overlap areas 603.

Figure 9:
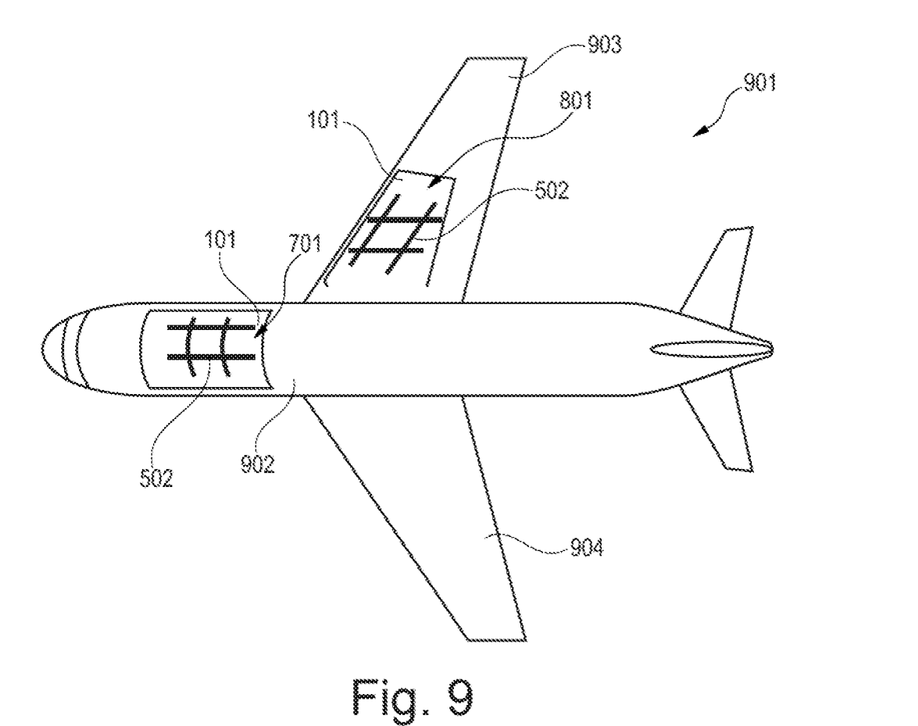
FIG. 9 is a schematic plan view of an aircraft in accordance with an embodiment of the invention, comprising two structural parts, the strip-shaped areas being arranged in a check pattern on the vehicle structural part of the aircraft fuselage and in a rhombus pattern on the vehicle structural part of the aerofoil.

FIG. 9 is a schematic plan view of a vehicle in accordance with an embodiment of the invention, using the example of an aircraft 901. The aircraft comprises an aircraft fuselage 902 and two aerofoils 903 and 904. The aircraft fuselage 902 and the aerofoil 903 may comprise a vehicle structural part 101. Strip-shaped areas 502 which are arranged in a check pattern 701, for example, may be formed on the vehicle structural part 101 of the aircraft fuselage. By contrast, on the vehicle structural part 101 which is arranged on an aerofoil 903, the strip-shaped areas 502 may be arranged in a rhombus pattern 801.

Figure 10:
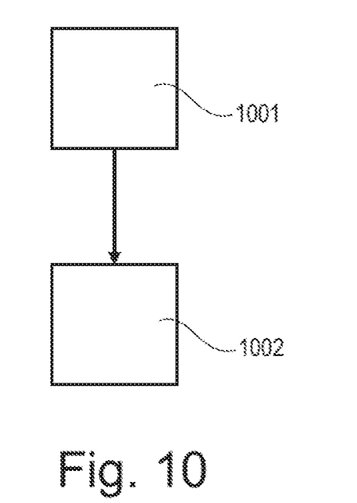
FIG. 10 is a flow chart of a method for producing structural parts comprising residual tensions in accordance with an embodiment of the invention.

FIG. 10 is a flow chart of a method in accordance with an embodiment of the invention for reinforcing a vehicle structural part 101. In a first step 1001, in a first area a compressive residual tension 203 is produced in a first direction 201 and a compressive or tensile residual tension 204 is produced in a second direction 202 perpendicular to the first direction 201, the ratio of the compressive residual stress 203 in the first direction 201 and the compressive or tensile residual stress 204 in the second direction 202 lying between −0.2 and +1.0. In a second step 1002, in a second area a compressive residual tension 203 is produced in a third direction and a compressive or tensile residual tension is produced in a fourth direction, the ratio of the compressive residual stress 203 in the third direction and the compressive or tensile residual stress 204 in the fourth direction lying between −0.2 and +1.0. In this context, the first and the second area may overlap in part or in whole. Subsequently, further areas of this type may be produced.

For completeness, it should be noted that "comprising" or "having" does not preclude other elements or steps and "a" or "an" does not preclude a plurality. It should further be noted that features which have been disclosed with reference to one of the above embodiments can also be used in combination with other features of other embodiments disclosed above. Reference numerals in the claims should not be considered as limiting.

The invention claimed is:

1. An aircraft structural part comprising:
  a first area in which there is a compressive residual stress in a first direction and a compressive or tensile residual stress in a second direction perpendicular to the first direction;
  wherein the first area is configured for deflecting a propagation direction of cracks from an initial propagation direction thereby resulting in U-shaped or L-shaped cracks so as to protect a second area of the aircraft structural part from cracks, and wherein a ratio of the compressive residual stress in the first direction and the compressive or tensile residual stress in the second direction lies between −0.2 and +1.0.

2. The aircraft structural part according to claim 1, wherein the compressive residual tension in the first direction and the compressive or tensile residual tension in the second direction are produced by laser shock peening.

3. The aircraft structural part according to claim 1, wherein the first area extends from a first surface region of the aircraft structural part into the aircraft structural part over 30% to 100% of the material thickness.

4. The aircraft structural part according to claim 1, wherein the first area is configured in the shape of a strip.

5. The aircraft structural part according to claim 4, wherein the first area is configured in the shape of a straight strip.

6. The aircraft structural part according to claim 4, wherein the first area is configured in the shape of a strip comprising at least one curve.

7. The aircraft structural part according to claim 4, wherein the strip has a width of 50 mm to 10 mm.

8. The aircraft structural part according to claim 1, configured to absorb a tensile load which is caused by the driving operation of an aircraft comprising the aircraft structural part;

wherein the compressive residual stress in the first direction comprises a component in the direction of the tensile load which component is configured to reduce the tensile load.

9. The aircraft structural part according to claim 1, comprising:

a second area in which there is a compressive residual stress in a third direction and a compressive or tensile residual stress in a fourth direction perpendicular to the third direction;

wherein the ratio of the compressive residual stress in the third direction and the compressive or tensile residual stress in the second direction lies between −0.2 and +1.0.

10. The aircraft structural part according to claim 9, wherein the first area and the second area are of the same shape and have longitudinal extensions which are arranged parallel with respect to each other.

11. The aircraft structural part according to claim 10, wherein the first area and the second area are at a distance of 50 cm to 10 cm from one another.

12. The aircraft structural part according to claim 9, wherein the longitudinal extensions of the first area and the second area are not arranged mutually parallel.

13. An aircraft comprising an aircraft structural part comprising:

a first area in which there is a compressive residual stress in a first direction and a compressive or tensile residual stress in a second direction perpendicular to the first direction;

wherein the first area is configured for deflecting a propagation direction of cracks from an initial propagation direction thereby resulting in U-shaped or L-shaped cracks so as to protect a second area of the aircraft structural part from cracks, and wherein a ratio of the compressive residual stress in the first direction and the compressive or tensile residual stress in the second direction lies between −0.2 and +1.0.

14. The aircraft structural part according to claim 1, wherein the ratio of the compressive residual stress in the first direction and the compressive or tensile residual stress in the second direction lies between −0.2 and +0.8.

15. The aircraft structural part according to claim 1, wherein the ratio of the compressive residual stress in the first direction and the compressive or tensile residual stress in the second direction lies between −0.2 and +0.6.

16. The aircraft structural part according to claim 1, wherein the ratio of the compressive residual stress in the first direction and the compressive or tensile residual stress in the second direction lies between −0.2 and +0.4.

* * * * *